United States Patent [19]
Machell et al.

[11] Patent Number: 5,231,135
[45] Date of Patent: Jul. 27, 1993

[54] LIGHTFAST COLORED POLYMERIC COATINGS AND PROCESS FOR MAKING SAME

[75] Inventors: Greville Machell, Moore; Robert L. Mahaffey, Spartanburg, both of S.C.

[73] Assignee: Milliken Research Corporation, Spartanburg, S.C.

[21] Appl. No.: 619,023

[22] Filed: Nov. 28, 1990

Related U.S. Application Data

[63] Continuation-in-part of Ser. No. 402,368, Sep. 5, 1989, abandoned.

[51] Int. Cl.$^5$ .................. C08L 71/02; C08L 31/06; C08L 61/28; C08L 8/30
[52] U.S. Cl. ........................ 525/123; 525/127; 525/154; 525/163; 525/187; 525/452; 525/519; 525/528; 525/530; 525/533; 525/466; 525/408; 525/409
[58] Field of Search ............. 525/405, 509, 123, 127, 525/154, 163, 187, 452, 519, 528, 530, 533, 406, 408, 409

[56] References Cited

U.S. PATENT DOCUMENTS

| | | | |
|---|---|---|---|
| 4,284,729 | 8/1981 | Cross et al. | 521/158 |
| 4,386,195 | 5/1983 | Bremer et al. | 528/85 |
| 4,826,978 | 5/1989 | Migdal et al. | 524/100 |
| 5,066,687 | 11/1991 | Rieper et al. | 524/190 |

Primary Examiner—James J. Seidleck
Assistant Examiner—W. R. H. Clark
Attorney, Agent, or Firm—Timothy J. Monahan; Terry T. Moyer

[57] ABSTRACT

A method of forming a colored polymer coating on a substrate is disclosed which comprises mixing a reactive polymer, a reactive colorant, and a linking agent, and reacting the linking agent with the reactive polymer and reactive colorant under suitable conditions to form the colored polymer coating. The polymer from which the coating is formed has reactive groups which can react with the linking agent. The reactive colorant has the general formula:

R-[polymeric constituent-X]$_n$ wherein R is an organic dyestuff radical; the polymeric constituent is selected from polyalkylene oxides and copolymers of alkylene oxides in which the alkylene moiety of the polymeric constituent contains 2 or more carbon atoms; n is an integer from 1 to about 6; and X is a reactive moiety. The linking agent has a reactive group capable of reacting with reactive groups in the polymer and a reactive group capable of reacting with the reactive moiety of the reactive colorant. A method of coating a substrate with a lightfast colored polymer finish is also disclosed which comprises forming a colored polymer coating on the substrate in accordance with the method described above and then overcoating the colored polymer coating with a second polymer layer containing an ultraviolet absorber. A composition comprising a mixture of the coating polymer, a reactive colorant, and a linking agent is also disclosed.

15 Claims, 6 Drawing Sheets

LIGHTFAST COLORED POLYMERIC COATINGS AND PROCESS FOR MAKING SAME

RELATED APPLICATIONS

This is a continuation-in-part application of U.S. patent application Ser. No. 07/402,368, filed Sept. 5, 1989, now abandoned, reference being made herein to obtain the benefit of its earlier filing date.

FIELD OF THE INVENTION

The present invention relates to colored polymeric coatings for application to various substrates. More particularly, the coatings incorporate reactive colorants which provide improved lightfast color to such coatings.

BACKGROUND OF THE INVENTION

Colored polymer coatings are used to protect and enhance the appearance of many different types of surfaces. Due to their durability, polymer coatings are often employed where the surface will be subject to prolonged wear or exposure to the elements and sunlight. In such applications it is essential that the coating retain its color despite the conditions to which it is exposed.

Colored polymer coatings are widely used in the automotive industry. The majority of cars manufactured today are painted with a "top coat system" which employs one or more layers of polymer coating. In such a system the bare metal of the auto body is first treated with a primer, usually an epoxy primer. The primer is then covered with a "basecoat" polymer layer that confers color and may also contain metal flakes if a metallic finish is desired. The base coat is then covered with a transparent "topcoat" or "overcoat" polymer layer that protects the basecoat from the elements. The topcoat may also contain an ultraviolet radiation absorber which helps to protect the basecoat from ultraviolet light.

It is preferred that such coatings are "lightfast" (i.e., exhibit stable coloration after prolonged exposure to light). Unfortunately, many coloring materials, including dyes and pigments, are degraded to varying degrees by prolonged light exposure. With time, colored coatings containing such materials will lose their color as the coloring material deteriorates, thus diminishing the aesthetic appeal of the coating. Other colored coating preparations grow darker or even change color with light exposure producing unwanted changes in appearance of the finish. Some protection is provided by incorporating an ultraviolet absorber in the topcoat layer. Although an absorber stops a significant portion of ultraviolet light from reaching the colored base coat, enough ultraviolet light makes it past the absorber that degradation of the coloring agent in the base coat is still a problem.

Traditional topcoat systems have for the most part relied on particulate pigments in the basecoat layer for coloring. The pigment is supplied in the form of opaque particles of associated pigment molecules which are suspended in the basecoat polymer. The pigment molecules on the outside of each particle contribute to coloring of the coating, while other molecules buried inside the particles are hidden and do not contribute to coloration of the coating. As one pigment molecule on the outside of a given particle is degraded by light and becomes dissociated from the particle, another molecule in the next layer of the particle is then exposed and can contribute to coloring the coating. As a result, although individual molecules of pigment are not lightfast, the total number of pigment molecules which contribute to coloration of the coating is maintained relatively constant.

Despite this advantage, however, pigments have demonstrated a legion of disadvantages for use in making polymer coatings. Since the majority of pigment molecules are buried within the interior of particles, pigments require use of much larger quantities of colorant as compared to molecularly dispersed dyes, wherein each individual molecule used in the coating contributes to coloration. Pigments are particulate solids which are difficult to handle and mix with other liquid coating components. Most pigments must be dispersed in a solvent and be specially milled (to form particles of a specific size) before they can be mixed with other coating components. The pigment particles also tend to settle out of coating preparations and require stirring to keep the color uniformly distributed throughout the coating. Particles also tend to agglomerate or flocculate, thus changing the consistency and performance of the coating. Since particulate pigments are relatively opaque, they also interfere with production of a truly transparent colored finish. Inclusion of the particulate pigments also tends to change the viscosity, rheology, and other physical characteristics of the polymer component of the coating. Finally, the pigment particles form "bumps" in the coating surface that reflect light in disparate directions, thus detracting from the desired mirror-like surface gloss of the coating.

Dyes show special utility for producing a truly transparent coloration. If a dye can be solubilized in a medium, unlike pigments, the dye molecules actually become molecularly dispersed throughout the solvent such that each molecule contributes to coloration. However, dyes have shown only limited utility in producing durable polymer coatings of the type previously described due to their volatility and poor solubility characteristics. Most dyes are practically insoluble in the types of polymers and solvents used for durable coatings. As a result, dyes have been difficult to combine with coating polymers. Although some coating mixtures containing dyes can be obtained, they tend to give non-uniform coloration due to the difficulty of achieving a true solution. In many instances the dye will actually leach, bleed or bloom out of the applied coating, resulting in loss of coloration. Prolonged exposure to heat may also volatilize the dye, thus allowing it to escape from the coating layer. For all of these reasons, dyes have not been widely used in such applications.

SUMMARY OF THE INVENTION

In accordance with the present invention, a method of forming a colored polymer coating on a substrate is disclosed which comprises mixing a polymer, a reactive colorant, and a linking agent; and reacting the linking agent with the polymer and reactive colorant under suitable conditions to form the colored polymer coating. The polymer from which the coating is formed has reactive groups which can react with the linking agent. The reactive colorant has the general formula:

$$R\text{-[polymeric constituent-}X]_n$$

wherein R is an organic dyestuff radical; the polymeric constituent is selected from polyalkylene oxides and copolymers of alkylene oxides in which the alkylene moiety of the polymeric constituent contains 2 or more carbon atoms; n is an integer from 1 to about 6; and X is a reactive moiety. The linking agent has at least one (preferably at least two) reactive group capable of reacting with reactive groups in the polymer and a reactive group capable of reacting with the reactive moiety of the reactive colorant. Preferably, the reactive colorant contains an azo or anthraquinone dyestuff radical.

A method of coating a substrate with a lightfast colored polymer finish is also disclosed which comprises forming a colored polymer coating on the substrate in accordance with the method described above and then overcoating the colored polymer coating with a second polymer layer containing an ultraviolet absorber. In certain embodiments the ultraviolet absorber is covalently bound to the polymer in the overcoat layer.

A composition comprising a mixture of the coating polymer, a reactive colorant, and a linking agent is also disclosed. Such composition is useful for making paints for automobile finishes and the like.

The compositions and method of the present invention employ lightfast dyestuffs that have been chemically modified to overcome many of the problems associated with prior pigment and dye preparations. As compared to pigments, colorants used in the present invention have a much higher color value (i.e., lower amounts of reactive colorant need be added to a coating preparation to yield the same amount of color intensity). The colorants are used in the present invention in a liquid form which is soluble and compatible with a wide range of solvents. The liquid form also eases processing and eliminates the agglomeration, flocculation and settling problems associated with particulate pigments. Since the colorant is covalently bound to a polymer, the preparations of the present invention are not subject to volatility, leaching, bleeding and blooming associated with the use of dyes in the past. The coatings produced by the present invention are truly transparent, durable coatings which exhibit an intense, lightfast color. The methods and compositions of the present invention are especially useful in the finishing of automobiles and other substrates that require a durable, lightfast colored finish.

The coatings of the present invention can be applied to any substrate to which the coating will bond, adhere or absorb. Potential substrates include without limitation metal, plastics, elastomers, glass, wood, textile fabrics and polymer films. The substrates can be pretreated with primers or other substances prior to application of the coatings of the present invention to facilitate adhesion of the coating. In preferred embodiments, the substrate is a metal automobile body.

DESCRIPTION OF THE INVENTION

Figure 1:
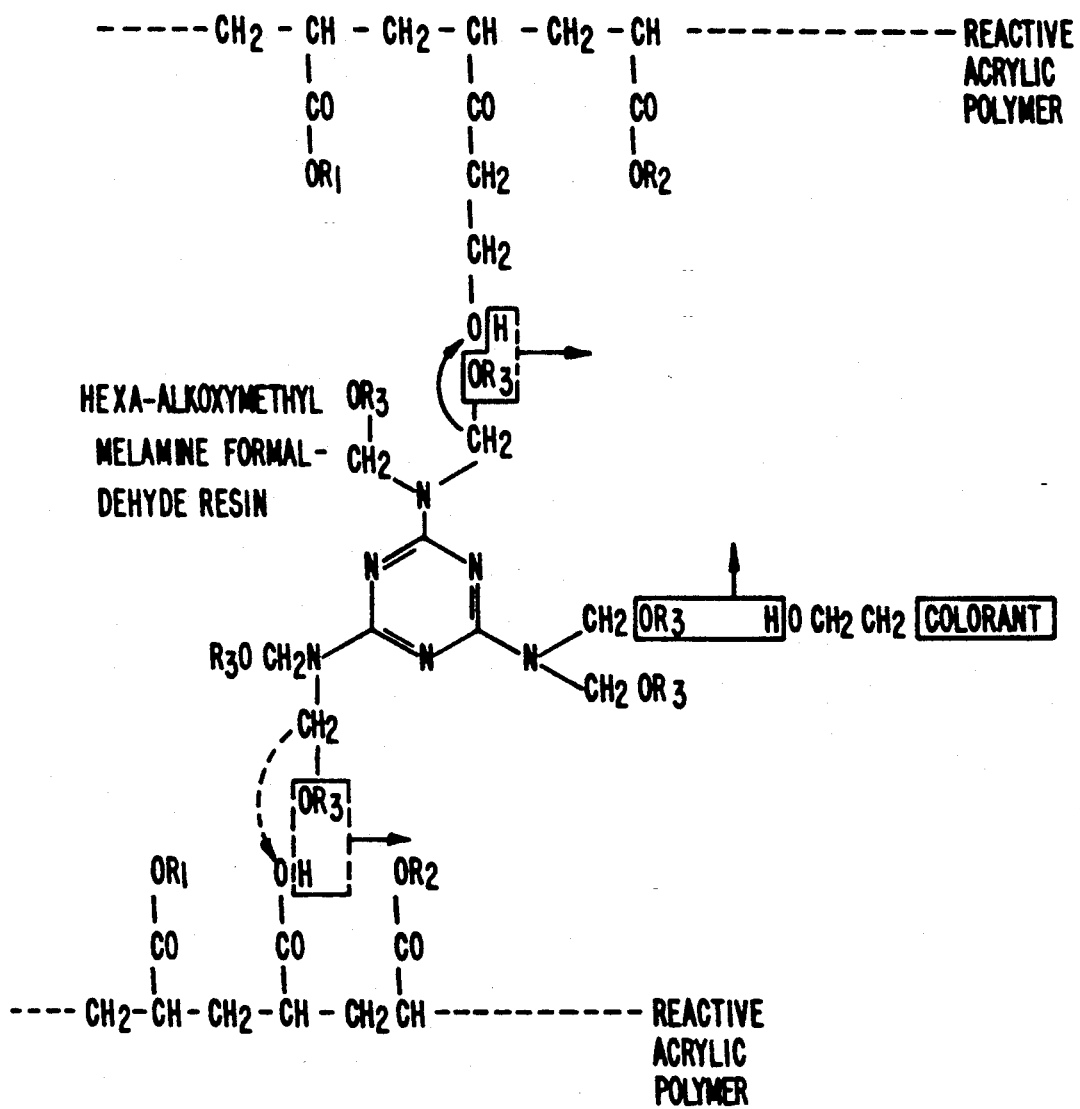
FIG. 1 depicts a reaction between a reactive polymer, a linking agent and a reactive colorant in accordance with one embodiment of the present invention.

The polymer used in practicing the present invention can be any organic polymer which has reactive groups which can react with the linking agent. Preferred polymers contain pendant or terminal reactive groups such as hydroxyl, amide, thiol, amine, carboxylic acid and carboxylic ester. Examples of suitable polymers are acrylics, polyesters and polyurethanes. More particularly, the following reactive resins are useful: copolymers of methyl methacrylate, styrene, butyl acrylate, methacrylic acid and hydroxyethyl methacrylate as well as copolymers of neopentyl glycol, adipic acid, isophthalic acid and pentaerythriotol. The polymer can be in either liquid or solid form when it is mixed with the reactive colorant and linking agent. For example, when a new car finish is applied, a mixture of the coating polymer and a linking agent in a suitable solvent are usually sprayed onto the metal surface as a liquid mixture. After application of the liquid mixture, the sprayed surface is heated to evaporate the solvent and cause a "curing" reaction between the polymer and the linking agent and producing a cross linked solid polymer. In contrast, when a car finish is repainted, the linking agent (and additional polymer) is sprayed onto the existing solid polymer finish. The linking agent then "mixes" with the solid polymer (and the newly applied liquid polymer). Once again, the sprayed surface may be heated, causing a curing reaction between the solid linking agent and the solid and liquid polymer to form a refinished solid polymer coating. In other embodiments, the polymer, linking agent and/or reactive colorant are mixed in powdered form and applied by electrostatic spraying. On heating of the sprayed - article, the powder fuses and the components react. In practicing the present invention, each of the reacting components can be provided in solid (e.g., cured or powdered) or liquid form.

In all of these situations, the linking agent is in "mixture" with the solid, liquid and/or powdered polymer. In similar applications employing the methods and compositions of the present invention, the reactive colorant is included in such mixtures and applied with or separate from the linking agent. For the purpose of the present discussion and the appended claims, "mixture" or "mixing" of components means contacting such components, in whatever form, such that they can react as described herein. In one embodiment, the mixture of polymer, linking agent and reactive colorant is prepared and used in the form of an automotive paint.

The active colorants used in practicing the present invention have the general formula:

R-[polymeric constituent-X]$_n$ in R is an organic dyestuff radical and X is a reactive moiety. X can be any pendant or terminal reactive group which will react with reactive groups on the linking agent to covalently bond the reactive colorant to the linking agent. Preferably, X is selected from —OH, —NH$_2$ and —SH.

Preferred colorants used in the process of the present invention are liquid materials at ambient conditions of temperature and pressure. The dyestuff radical of the liquid colorants may vary widely, depending to a large extent upon the desired color and properties of the final polymeric product. Preferably, the organic dyestuff radical is attached to the polymer constituent through an amino or amide nitrogen. Examples of suitable dyestuff radicals include nitroso, nitro, azo, including monoazo, disazo, and trisazo, diarylmethane, xanthene, acridine, methine, thiazole, indamine, azine, oxazine, or anthraquinone dyestuff radicals. Particularly useful in the preparation of the colorants of the invention are azo and anthraquinone dyestuff radicals.

The polymeric constituent of the colorants used in the process of the invention may be any suitable polymeric constituent which renders the resulting colorant liquid. Typical of such polymeric constituents which may be attached to the dyestuff radical are the polymeric epoxides, such as the polyalkylene oxides and copolymers thereof. Typical polyalkylene oxides and copolymers of same which may be employed to provide the liquid colorant of the present invention are polyethylene oxides, polypropylene oxides, polybutylene oxides, copolymers of ethylene oxide, propylene oxide and butylene oxide, and other copolymers including block copolymers, in which a majority of polymeric constituent is polyethylene oxide, polypropylene oxide and/or polybutylene oxide. Preferably, the polymeric constituent has at least three monomeric units selected from ethylene oxide, propylene oxide and butylene oxide and more preferable from 5 to 50 of the aforesaid monomeric units.

In applications using a water based or water reduced system, the solubility of the reactive colorant may be enhanced by incorporating predominantly ethylene oxide monomer polymeric constituent. Other modifications to the polymeric constituent are disclosed in Farmer, U.S. Pat. No. 4,137,243.

Although any of the dyestuff radicals previously described can be used to produce reactive colorants for practicing the present invention, it is preferred that the dyestuff be chosen such that reaction with the polymer or linking agent will not change the color or reduce the lightfastness of the radical. For example, radicals with unhindered reactive hydrogens, although useful in practicing the invention, are not preferred.

Any suitable procedure may be employed to produce the reactive colorants, including without limitation those described and incorporated in U.S. Pat. Nos. 4,137,243 and 4,284,729, which are incorporated in their entirety herein by reference.

Any compound having reactive groups which will react with both the reactive groups of the coating polymer and the reactive moiety of the reactive colorant may be used as a linking agent in practicing the present invention. Since one function of the linking agent is to attach the reactive colorant to the coating polymer, the linking agent must have at least two distinct reactive groups—one which can react with the colorant while the other reacts with the polymer. The distinct reactive groups can be either the same or different functional groups. For example, one type of functional group may react preferentially with the colorant while a different functional group may react preferentially with the coating polymer. One molecule of linking agent can also include a multiplicity of reactive groups for reaction with the colorant and the polymer. Many useful linking agents are currently in use for applying and refinishing polymer based paints and coatings. Polyisocyanates (particularly polymeric hexamethylene di-isocyanate) and melamine-formaldehyde resin derivatives are preferred linking agents which have a multiplicity of sites for reaction with the colorants or the coating polymer. Other suitable linking agents are known to those in the art and include without limitation polyaziridines, polyepoxides, and other aminoplast resins. Preferred reactive groups include —NCO,

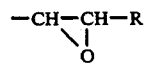

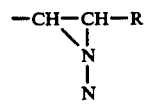

wherein R is hydrogen or a $C_1$–$C_6$ alkyl group (preferably methyl or butyl).

In practicing the method of the present invention, the coating polymer, linking agent and reactive colorant are contacted together and then reacted (or allowed to react) under suitable conditions to form a colored polymer coating. "Suitable conditions" are those conditions required to cause reaction of the linking agent with the polymer and the reactive colorant. For example, a mixture of an acrylic polymer, melamine-formaldehyde resin and a reactive colorant is heated to 120–150° C. to "cure" the coating. The heat initiates the reaction between melamine-formaldehyde resin and the acrylic polymer and colorant. Similarly, coatings employing isocyanates are heated to 120° C. or merely allowed sufficient time at ambient temperature to produce the desired reaction. Suitable conditions for reacting a chosen polymer, reactive colorant and linking agent are dictated by the chemical character of such components and the presence or absence of catalysts and will be apparent to those skilled in the art. The reactants are maintained at a temperature sufficient to react the reactive group of the polymer and a reactive group of the linking agent to form a covalent bond between the two. Likewise, the temperature is maintained sufficiently to react the reactive moiety of the colorant with another reactive group of the linking agent to form a second covalent bond. Preferably, the reactants are heated to a temperature of between 90° and 180° C. to promote reaction.

The coatings of the present invention can also be overcoated with a second polymer layer that contains an ultraviolet absorber. Although the colorant coatings of the present invention exhibit significantly improved lightfastness as compared to prior coatings, the additional of an ultraviolet absorber to the complete topcoat system renders even better performance. Although any known ultraviolet absorber which can be incorporated into a suitable polymer overcoat can be used, those absorbing the radiation between 290 and 400 nm while transmitting all visible light are preferred. Such absorbers include without limitation benzotriazoles, hydroxyphenyl triazine compounds, hydroxybenzophenones, phenylacrylates, oxalanilides, aryl esters and hydroxybenzoates. Especially preferred ultraviolet absorbers are the hydroxyphenyl triazine compounds disclosed in U.S. Pat. No. 4,826,978, which is incorporated in its entirety herein by reference.

In some applications the ultraviolet absorber is covalently bound to the polymer in the overcoat layer by copolymerization or by reacting the absorber with reactive groups on a preformed polymer. In the case of cured coatings, such as reactive acrylics cross-linked with melamine-formaldehyde or isocyanates, the reactive ultraviolet absorbers may become bonded to the coating during crosslinking where the ultraviolet absorbers react with the crosslinking agents. In two-part urethane coatings, where an isocyanate is reacting with a polyol or polyamine to form the final polymeric coating, the ultraviolet absorber becomes bound into the final polymer through reaction with the isocyanate. In the case of other coating systems, such as alkyds and unsaturated polyesters, the ultraviolet absorbers are bonded into the polymer during the original polymerization step and the polymers are then cured conventionally by a free radical mechanism.

In alternative embodiments, no linking agent may be employed and the reactive colorant may be reacted directly with the polymer. Such embodiments may require more vigorous reaction conditions (e.g., higher temperature) for promoting the reaction. It should also be noted that some direct reaction often also occurs between the reactive colorant and polymer in embodiments that utilize a linking agent.

The coatings of the present invention provide significant advantages over prior coatings. Unlike coatings employing conventional dyestuffs, the reactive colorant is covalently bound to the polymer and cannot migrate to the surface of the coating. As a result, color loss due to volatilization and leaching is significantly reduced. Covalent bonding of the reactive colorant also confers additional protection against ultraviolet radiation. Since the reactive colorant is bound to the polymer, any ultraviolet light energy received directly by the colorant may be dissipated in harmless fashion through this covalent bond. These features among others, produce coatings which exhibit increased lightfastness and color retention as compared to prior coatings.

The following examples are intended as illustrative and do not place limitations on the present invention which is defined by the scope of the appended claims.

EXAMPLES

Test Procedures for Lightfastness

The laboratory accelerated test procedures were used to predict the level of color change taking place on outdoor exposure to sunlight, rain, etc.

ASTM G53-84

Light-and water-exposure apparatus (fluorescent UV-condensation type) known as the QUV tester, and made by the Q-Panel Company. The unit was equipped with UVA 340 lamps to simulate closely the U.V. spectrum of natural sunlight. It was operated on the following cycle: 8 hours of light at 70° C., followed by 4 hours of light plus water condensation at 50° C.

ASTM G-26-84

Light-and water-exposure apparatus (Xenon-arc type) known as the Xenotest 1200 tester, and made by W. C. Heraeus GmbH, Hanau, West Germany. It was equipped with special U.V. filters to remove most of the low-wavelength U.V. light not present in sunlight. The cycle used was: 102 minutes of light at 63° C. and 50% relative humidity, followed by 18 minutes of light plus direct water spray.

After exposure to one of the two procedures detailed above the extent of color change was determined using a Hunter Lab Labscan 5100 Spectrocolormeter, made by Hunter Associates Laboratory, Inc. The total color change was expressed in delta E units. A delta E value of 1.5 can generally be detected visually, and in some cases is considered to be the maximum allowable change for a commercial coating.

EXAMPLE 1

This example illustrates the use of a range of reactive colorants in an acrylic-isocyanate automotive coating system. The reactive colorants examined are listed in Table 1.

TABLE 1

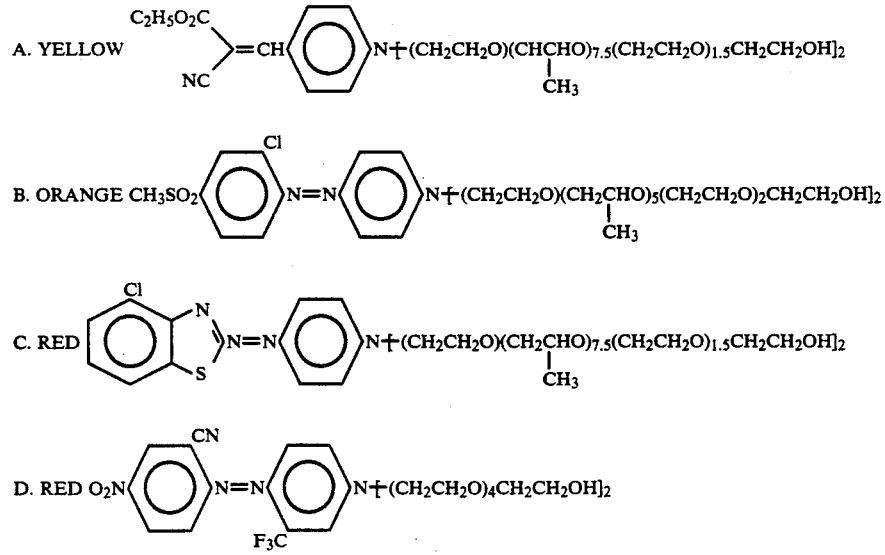

TABLE 1-continued

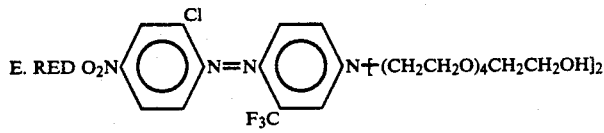

E. RED

F. RED

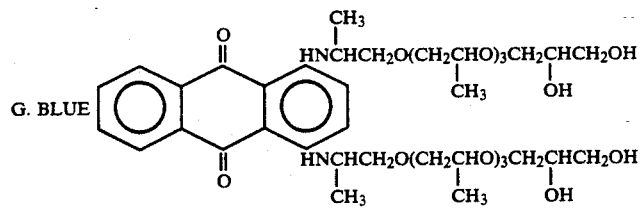

G. BLUE

These colorants were incorporated into the following coating formulation, where the amounts are in parts by weight:

|  | As is Basis | Active Solids |
|---|---|---|
| Acryloid AU608S reactive acrylic resin (a product of Rohm & Haas Co.) | 63.3 | 38.0 |
| Desmodur N-75 aliphatic polyisocyanate (a product of Mobay Co.) | 16.0 | 12.0 |
| Tinuvin 328 U.V. absorber (a product of Ciba-Geigy Co.) | 1.0 | |
| Tinuvin 292 hindered amine light-stabilizer (a product of Ciba-Geigy Co.) | 0.25 | |
| Reactive Colorant | 1.25 | |
| Catalyst T-12 (dibutyltin dilaurate; a product of M & T Chemical Co.) | 0.02 | |

Each formulation was diluted to suitable spraying viscosity with a 3:1 (by volume) mixture of Cellosolve acetate and toluene, and then sprayed onto a weighed, epoxy-primed aluminum plate. After air-drying and curing for several days under ambient conditions, the coating thickness was calculated from the weight increase to be in the range 1.5–2.5 mils. These samples are referred to in FIG. 2 below as the "colored base-coat only" samples.

A second set of base-coated samples was then prepared, and over-sprayed with a clear (uncolored) topcoat using the same coating formulation without the reactive colorant. After drying and curing for several days, the top-coat thickness was found to be in the range 1.3–1.7 mils.

Figure 2:
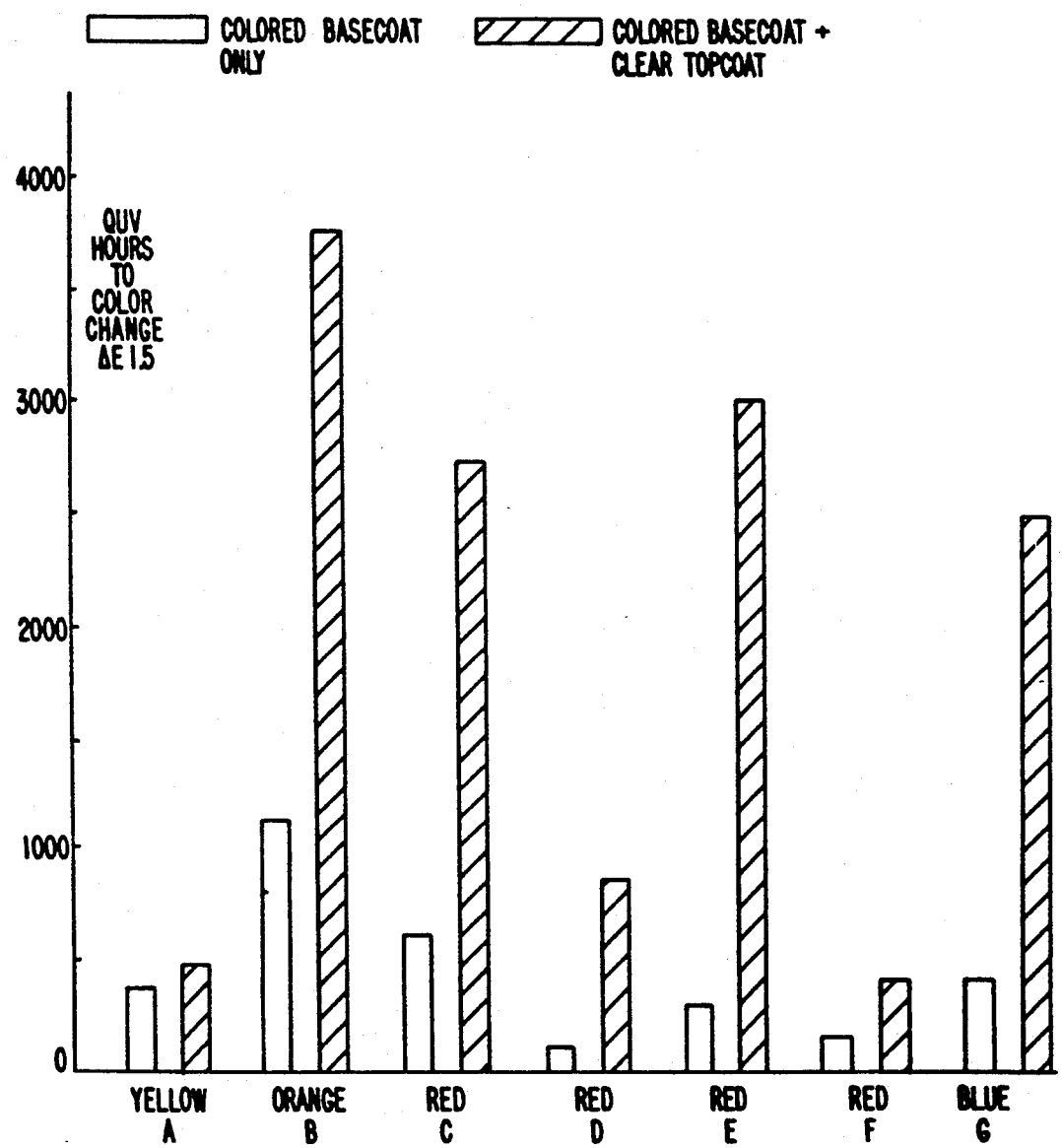
FIG. 2 is a graph summarizing lightfastness data for certain acrylic-isocyanate coatings made in accordance with the present invention.

All of the samples were then exposed in the QUV lightfastness tester, and the number of hours exposure required to reach a color change corresponding to a delta E value of 1.5 determined. These results are shown in FIG. 2. In all cases, the samples with the clear top-coat containing a U.V. absorber and light-stabilizer are superior in lightfastness to the samples base-coated only. A number of the top-coated samples show outstanding lightfastness, indicating their suitability for use in exterior coatings. An examination of the results for the top-coated red colorants D, E, and F illustrates the advantage of the chromophore structure in achieving high lightfastness.

EXAMPLE 2

In this example, a number of reactive colorants are compared with three automotive-grade pigments in an acrylic-melamine coating system. The reactive colorants include Yellow A, Orange B, Red C, and Blue G from example 1, along with:

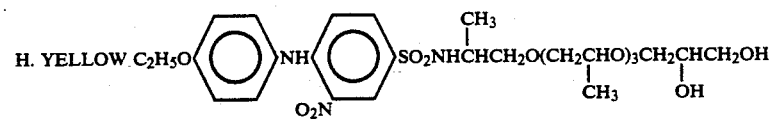

H. YELLOW

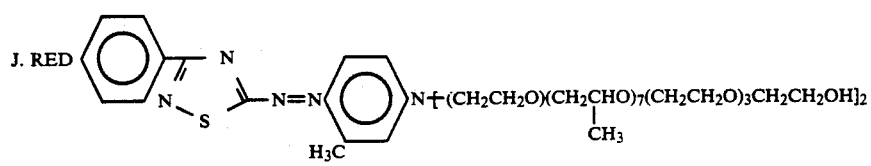

J. RED

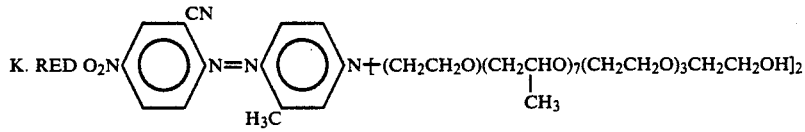

K. RED $O_2N$-⟨⟩-$N=N$-⟨⟩($H_3C$)-$N\text{\textendash}(CH_2CH_2O)(CH_2CHO)_7(CH_2CH_2O)_3CH_2CH_2OH]_2$ | $CH_3$ The pigments include Nuodex Yellow Pigment Dispersion 844-2560; Nuodex Quinacridone Red Pigment Dispersion 844-0451; and Nuodex Phthalocyanine Blue Pigment Dispersion 844-7262 (Nuodex is a Trade Mark of Chemische Werke Huels Co.)

The reactive colorants and pigment dispersions were incorporated into the following coating formulation:

|  | As is Basis | Active Solids |
| --- | --- | --- |
| Acryloid AT-56 reactive acrylic resin (a product of Rohm & Haas Co.) | 130.0 | 65.0 |
| Cymel 1168, a methoxymethyl isobutoxymethyl melamine-formaldehyde resin (American Cyanamid Co.) | 35.0 | 35.0 |
| Cycat 4040, a 40% solution of p-toluenesulfonic acid (American Cyanamid Co.) | 1.0 |  |
| Tinuvin 900 U.V. Absorber (Ciba-Geigy Co.) | 2.0 |  |
| Tinuvin 292 | 1.0 |  |

Figure 3:
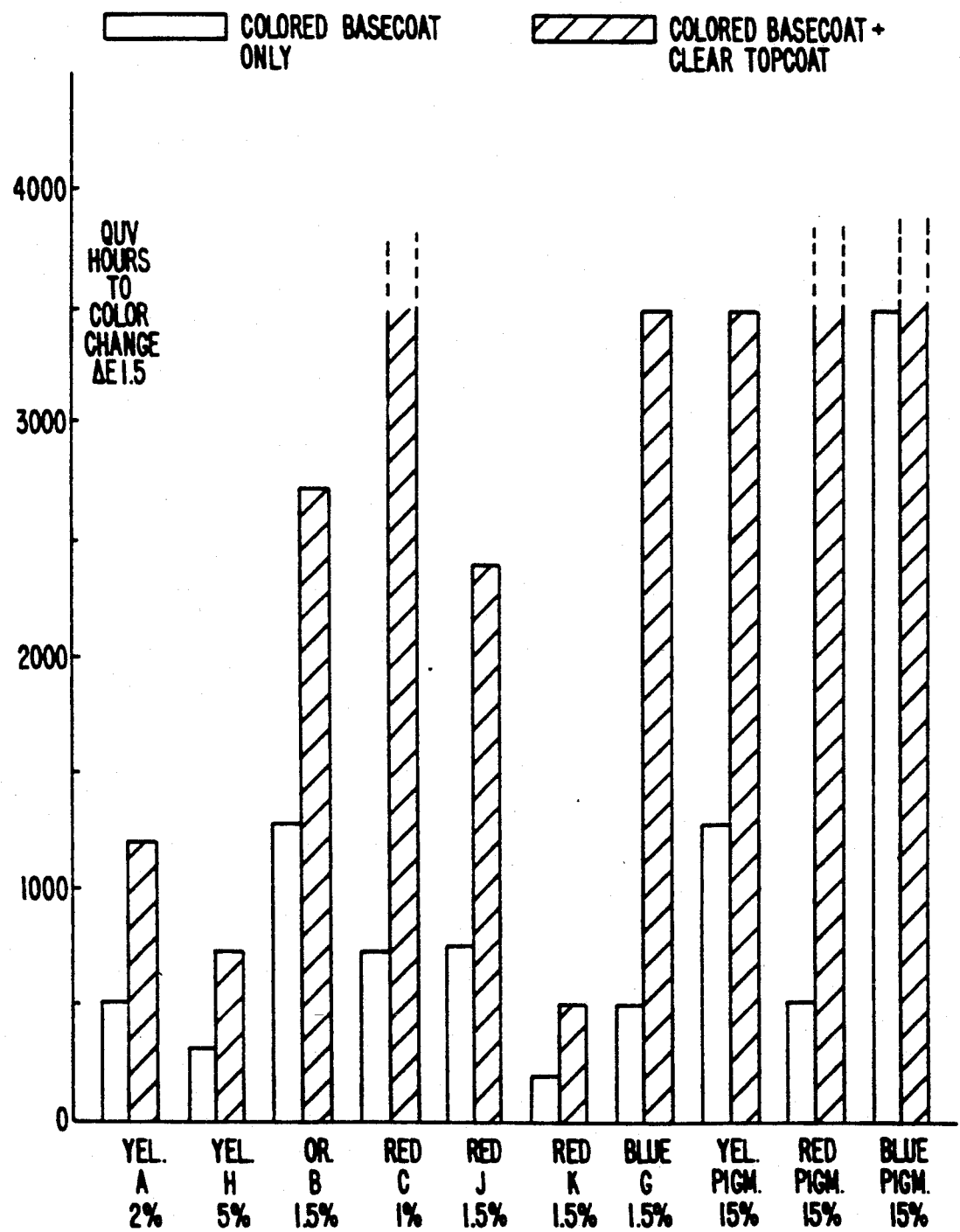
FIGS. 3 and 4 are graphs summarizing lightfastness data for certain pigment coatings and certain acrylic-melamine coatings made in accordance with the present invention. Broken lines indicate ongoing tests.

The reactive colorant, or pigment dispersion, was added in the amount shown in FIG. 3, the percentage being based on the total active solids in the coating formulation. Sufficient diluting solvent (a 3:1 by volume mixture of xylene and n-butanol) was added for the spraying of each coating onto an epoxy-primed aluminum plate. These colored base coats were then air-dried, and finally baked at 121° C. for 20 minutes. The thickness of the coating was then measured by micrometer to be in the range of 0.9–1.1 mils.

A second set of base-coated plates was then top-coated with the same formulation without any colorant, air-dried and baked as before. The top-coat thickness varied from 2.5 to 3 mils.

Exposure of these coated plates in the QUV tester produced the results shown in FIG. 3. Again, the samples with clear top coat are superior in performance. Four of the reactive colorants show good lightfastness for exterior use.

EXAMPLE 3

Figure 4:
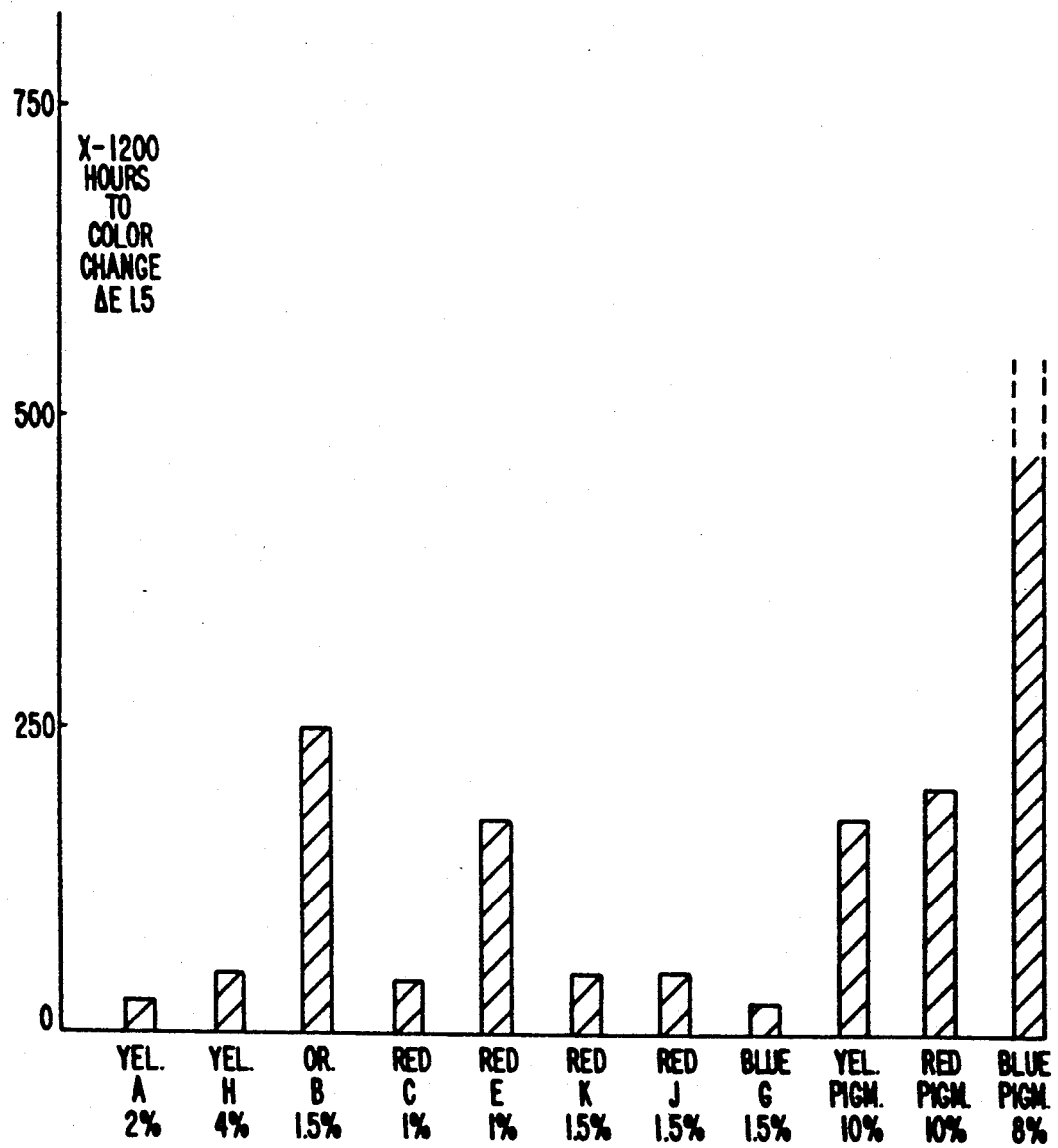

A second group of samples was made employing an acrylic-melamine coating system, but using different components from Example 2. The reactive colorants and pigments employed are all described in Examples 1 and 2, and the amounts used are shown in FIG. 4. Each colorant was incorporated into the following formulation:

|  | As is Basis | Active Solids |
| --- | --- | --- |
| Acryloid AT400CA reactive acrylic resin (Rohm & Haas) | 4.3 | 3.25 |
| Cymel 303, hexamethoxymethylmelamine (American Cyanamid) | 1.75 | 1.75 |
| Cycat 600, long-chain alkylaromatic sulfonic acid, 60% (American Cyanamid) | 0.077 |  |
| Di-isopropanolamine | 0.023 |  |
| Tinuvin 900 | 0.1 |  |
| Tinuvin 440, U.V. light stabilizer (Ciba-Geigy) | 0.075 |  |

The formulation was then diluted to a suitable viscosity with xylene/n-butanol, 3:1 ratio by volume. The coating was applied to epoxy-primed plates using a No. 30 draw-down rod, air-dried, then partially cured at 121° C. for 10 minutes. The base-coated plates were then top-coated with the same formulation without colorant using a No. 40 draw-down rod, and fully-cured at 121° C. for 20 minutes. At each stage the coating thickness was measured by micrometer and found to be: basecoats, 0.9 to 1.2 mils; top-coats, 1.7–2.3 mils.

These samples were exposed to accelerated weathering in the Xenotest 1200, which has a much higher acceleration rate than the QUV used previously. The results are shown in FIG. 4, where it is seen that two of the reactive colorants—Orange B and Red E—show similar outstanding lightfastness to the yellow and red pigments.

EXAMPLE 4

The Yellow A and Yellow H colorants used in examples 1, 2 and 3 showed limited lightfastness, even with a clear top coat containing U.V. absorber and light stabilizer.

Four new reactive yellow colorants were synthesized with the structures shown below:

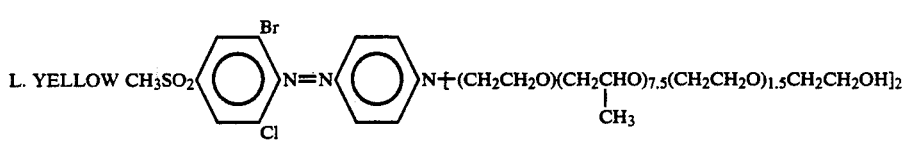

L. YELLOW $CH_3SO_2$-⟨Br,Cl⟩-$N=N$-⟨⟩-$N\text{\textendash}(CH_2CH_2O)(CH_2CHO)_{7.5}(CH_2CH_2O)_{1.5}CH_2CH_2OH]_2$ | $CH_3$

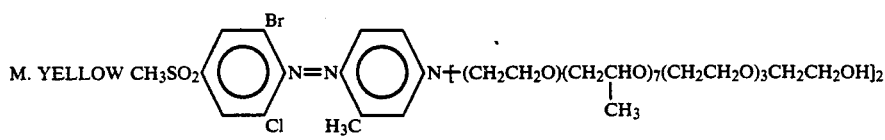

M. YELLOW $CH_3SO_2$-⟨Br,Cl⟩-$N=N$-⟨$H_3C$⟩-$N\text{\textendash}(CH_2CH_2O)(CH_2CHO)_7(CH_2CH_2O)_3CH_2CH_2OH]_2$ | $CH_3$

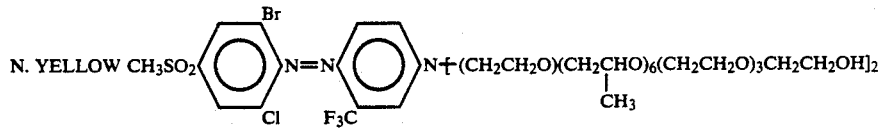

N. YELLOW

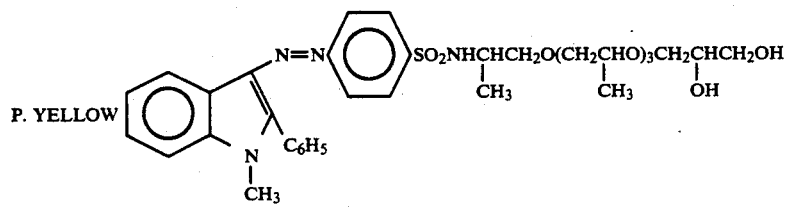

P. YELLOW

These colorants were incorporated into the acrylic-isocyanate coating formulation shown below in amounts shown in Table II:

|  | As is Basis | Active Solids |
|---|---|---|
| Acryloid AU608S reactive acrylic resin | 6.17 | 3.7 |
| Desmodur N3390 polyisocyanate (Mobay Co.) | 1.38 | 1.24 |
| SF1023 Silicone flow aid (General Electric) | 0.005 |  |
| Tinuvin 328 | 0.1 |  |
| Tinuvin 292 | 0.05 |  |
| Catalyst T-12 | 0.004 |  |

The formulations were diluted with xylene/butyl acetate (2:1 by volume), then coated onto epoxy-primed aluminum plates using a No. 30 draw-down rod. This was followed by drying and curing at 90° C. for 30 minutes. A second set of examples was base-coated as before, then top-coated without colorant using a No. 40 draw-down rod, and finally cured. Base-coat thicknesses were found to be in the range of 0.8–1.0 mil, while the top-coats measured at 1.3–2.0 mils.

Coated plates were exposed in the QUV tester along with similar plates made with Yellow A and Orange B as a comparison. Results are shown in Table II.

TABLE II

| | Lightfastness of Reactive Colorants in an Acrylic-Isocyanate Automotive Coating | | | | | | |
|---|---|---|---|---|---|---|---|
| Reactive Colorant | Amount used, % based on polymer | Delta E After QUV Exposure, Hours | | | | | |
| | | 250 | 500 | 850 | 1000 | 1400 | 1650 |
| Yellow L | 3 | 0.4 | 0.4 | 0.8 | 0.9 | 0.9 | 1.3 |
| Yellow M | 3 | 0.2 | 0.2 | 0.7 | 0.6 | 0.4 | 0.9 |
| Yellow N | 4 | 0.5 | 0.5 | 1.3 | NA | NA | NA |
| Yellow P | 2 | — | 0.3 | 0.3 | 0.5 | 1.0 | 1.5 |
| Yellow A | 2 | 0.8 | 2.3 | 3.7 | — | 6.1 | 0 |
| Orange B | 2 | 0.2 | 0.3 | 0.8 | 0.8 | 0.9 | 1.2 |

NA — not available - testing still in progress
Clearly, all four of these new reactive yellow colorants are superior to Yellow A (Example 1).

EXAMPLE 5

The reactive colorants described in Examples 1–4 are all characterized by reactive hydroxyl groups—primary and secondary. A colorant having reactive primary amine groups was synthesized, and had the structure shown below:

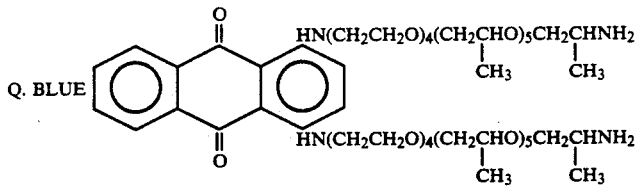

Q. BLUE

It was reacted into an acrylic/isocyanate base-coat plus clear top coat system, using the formulation and procedure cited in Example 4, and with 4% reactive colorant based on the polymer solids.

On exposure in the QUV tester, the delta E value was 1.8 after 269 hours, and 2.3 after 551 hours. This is less than the performance of Blue G in Example 1. The superiority of Blue G may lie in the branched nature of the substituents on the nitrogen atoms, which protect the latter from chemical attack.

EXAMPLE 6

Two or more reactive colorants may be blended together to give a third color. In this example, Orange B (1.33% based on polymer solids) and Blue G (2.67%) were reacted into an acrylic/isocyanate coating using the procedure and formulation of Example 4, yielding a black base-coat. This was then given a clear top-coat with U.V. absorber and light stabilizer. On exposure in the QUV tester, the delta E value was 0.3 after 232 hours, 0.4 after 488 hours, and 0.8 after 800 hours which indicates a high level of lightfastness.

EXAMPLE 7

To effect the curing of coatings on automobiles and other objects, the coating is often exposed to a high temperature; for example 120–150° C. for up to 1 hour. Again, during the life of an automobile, the coating is regularly exposed to sunlight, and temperatures as high as 90° C. have been recorded on the hood, roof, and trunk lid of an automobile in the height of summer in certain parts of the country. This high temperature exposure can lead to the loss of U.V. absorber from the coating by migration and volatilization. Further loss of U.V. absorber can take place by exposure of the coating to water, detergent, gasoline, windshield washer fluid, etc. Such loss of U.V. absorber would lead to increased exposure of the reacted colorant in the base-coat to deleterious U.V. light, and an increased rate of color change.

Loss of U.V. absorber may be prevented by the use of a U.V. absorber molecule, which can react chemically with the coating and become permanently attached. This example encompasses the use of such reactive U.V. absorbers in the top-coat over a base-coat containing reacted colorants.

The reactive colorant used in all of the samples below was Orange B (example 1) used at a level of 2% based on the total coating polymer solids. An acrylic-melamine coating system was employed using the basic formulation shown below:

|  | As is Basis | Active Solids |
|---|---|---|
| Acryloid AT400CA reactive acrylic resin | 4.3 | 3.25 |
| Cymel 1168 melamine resin | 1.75 | 1.75 |
| Cycat 600 catalyst | 0.015 |  |
| Di-isopropanolamine | 0.0046 |  |
| Tinuvin 440 |  | 0.05 |

The procedure for application and curing of the base-coats and top-coats was as described in Example 3. The base-coats and top-coats for each sample comprised the coating formulation above along with the following additional components shown in Table III. It should be noted that varying amounts of U.V. absorber were used in the top-coats according to the specific absorptivity of the U.V. absorber.

Figure 5:
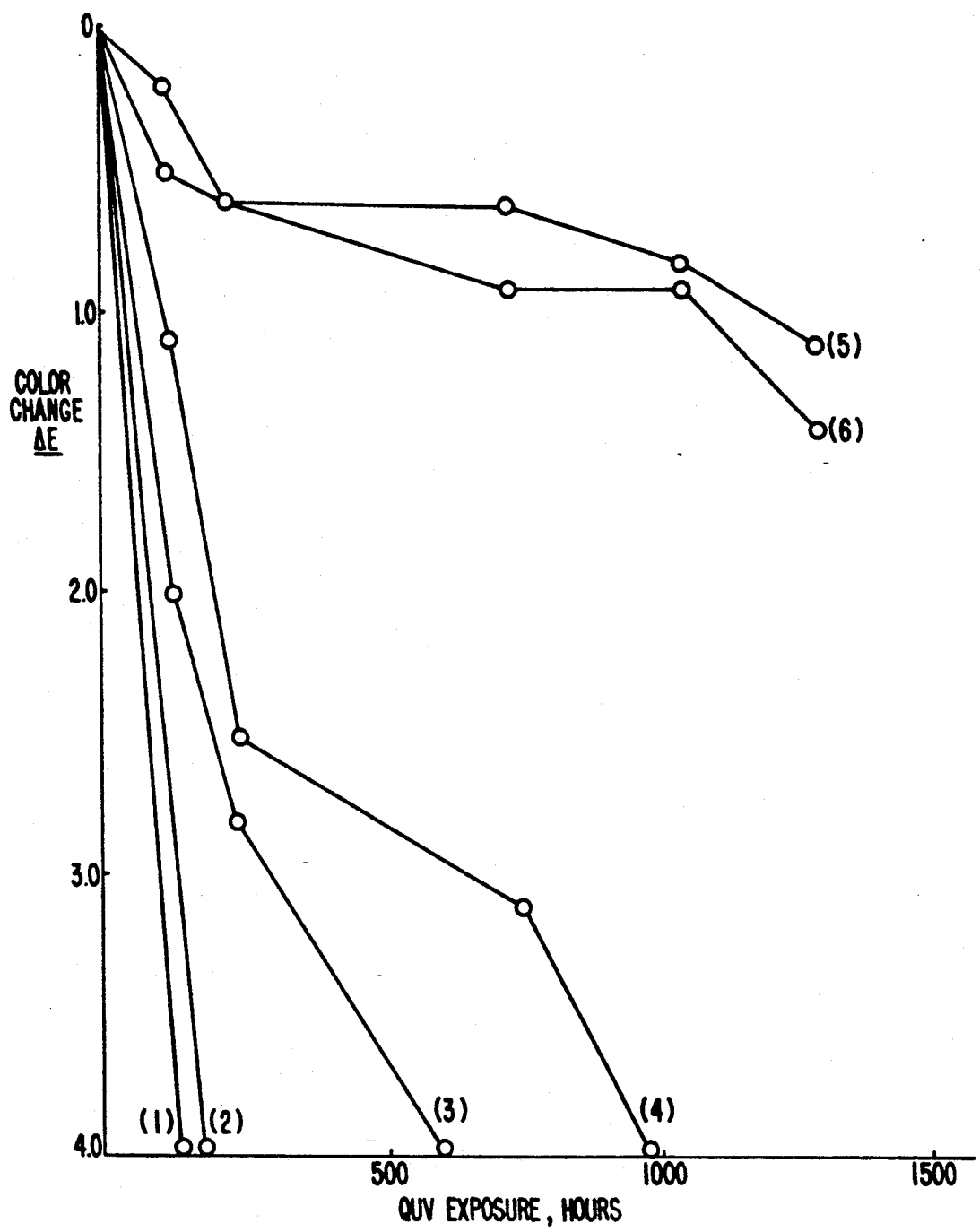
FIGS. 5 and 6 are graphs summarizing lightfastness data for certain coatings (acrylic-melamine and acrylic-isocyanate, respectively) made in accordance with the present invention containing various ultraviolet absorbers.

Following curing, the coated plates were held at 90° C. for 64 hours to simulate the effect of long term exposure to the temperature resulting from direct sunlight in a hot climate. The plates were then exposed in the QUV tester with the results shown in FIG. 5, where the two reactive U.V. absorbers show superior performance.

TABLE III

| Sample | Base Coat | Top Coat |
|---|---|---|
| (1) | Orange B only | None |
| (2) | Orange B 2% Tinuvin 328 | None |
| (3) | Orange B only | 2% Tinuvin 328 |
| (4) | Orange B 2% Tinuvin 328 | 2% Tinuvin 328 |
| (5) | Orange B only | 1% Millad XA-47 |
| (6) | Orange B only | 3.5% Tinuvin 1130 Partly Reactive |

Millad XA-47 has the chemical structure:

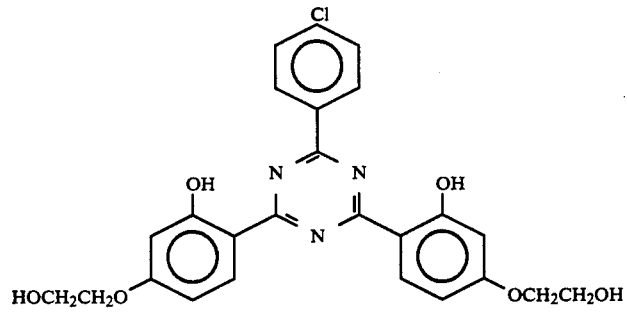

in which there are two reactive primary alcohol groups. This product was introduced into the coating formulation as a 2.5% solution in N-methylpyrrolidine.

Tinuvin 1130 is a product of the Ciba-Geigy Company containing components (A), (B) and (C) shown below:

(A) 52%: 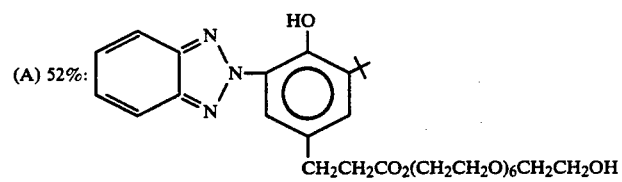

$CH_2CH_2CO_2(CH_2CH_2O)_6CH_2CH_2OH$ (B) 35%: 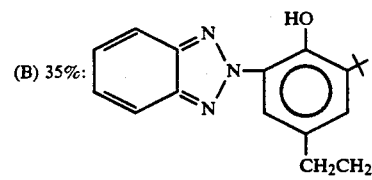 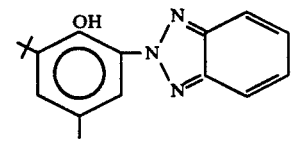

$CH_2CH_2CO_2(CH_2CH_2O)_7COCH_2CH_2$ (C) 13% polyethylene glycol

Component (a) has one reactive primary alcohol group.

EXAMPLE 8

This example is similar to Example 7 with the following changes:
1. The reactive colorant used in the base-coats was 2% Red C from Example 1.
2. The coating used was an acrylic-isocyanate system as formulated and applied in Example 4.

Figure 6:
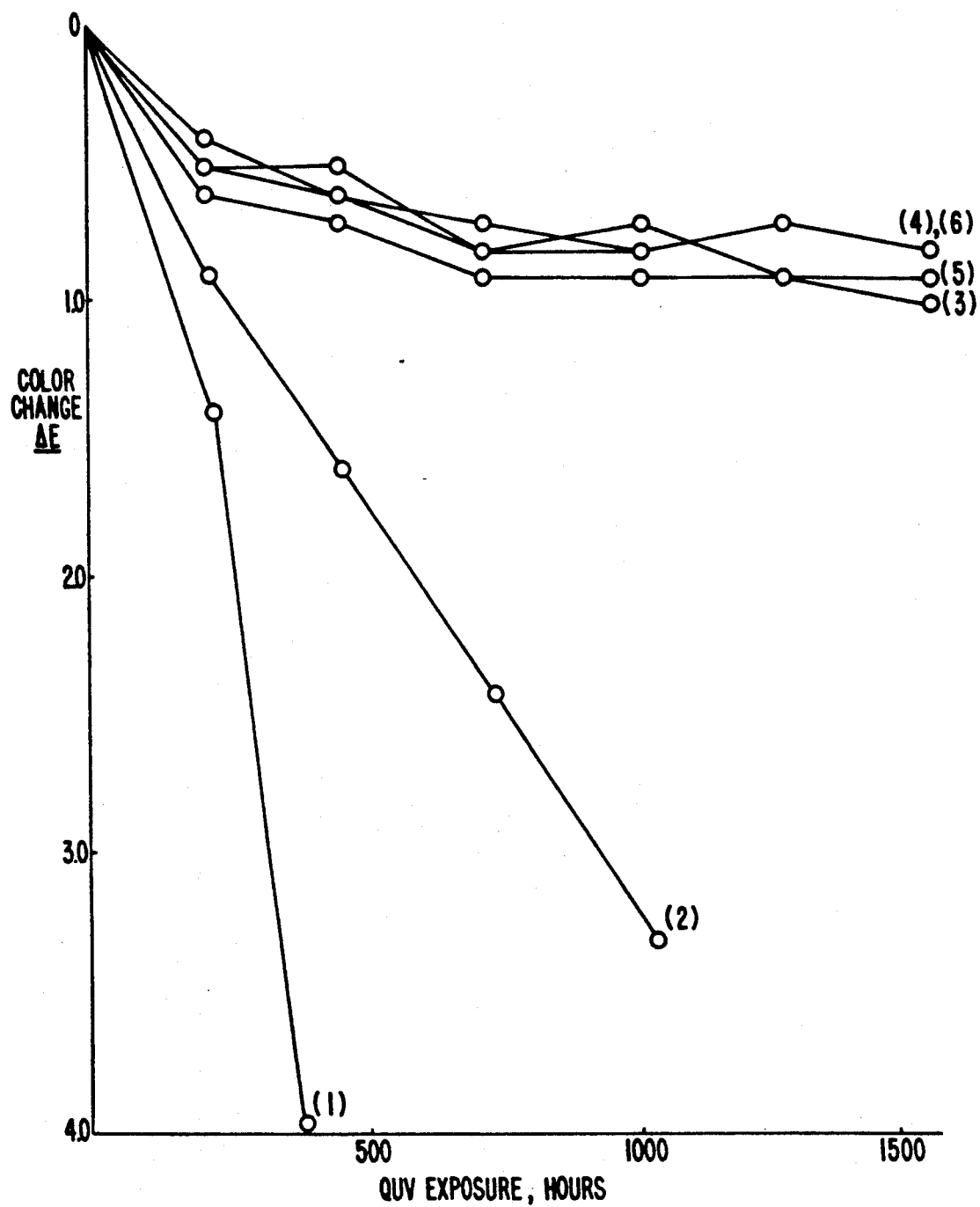

The coated plates were held at 90° C. for 264 hours, and then exposed in the QUV tester affording the results shown in FIG. 6. By contrast with the results of Example 7, there appears to be no significant additional advantage for a reactive U.V. absorber in the acrylic-isocyanate system. Possibly even the conventional U.V. absorber, Tinuvin 328 is reacting with the isocyanate by some undetermined mechanism, and becoming bound to the coating polymer.

EXAMPLE 9

This example demonstrates the high level of chemical bonding of the reactive colorant to the coating polymer during the cure step. Three reactive colorants: Orange B, Red C, and Blue G were incorporated separately into each of three different base-coat formulations: (1), (2), and (3) shown below:

|  | Parts By Wt. | Polymer Solids Parts By Wt. |
|---|---|---|
| Formulation (1) | | |
| Acryloid AU608S reactive acrylic resin | 12.34 | 7.4 |
| Desmodur N3390 aliphatic polyisocyanate | 2.75 | 2.48 |
| Reactive colorant | 0.15 | |
| Catalyst T-12 | 0.01 | |
| Butyl acetate | 2.0 | |
| Formulation (2) | | |
| As Formulation (1), but with 2.60 parts of Desmodur N3390. | | |
| Formulation (3) | | |
| Acryloid AT 56 reactive resin | 13.0 | 6.5 |
| Cymel 1168 melamine resin | 3.5 | 3.5 |
| Reactive colorant | 0.15 | |
| Cycat 4040 catalyst | 0.1 | |

These formulations, along with blanks containing no colorant, were coated onto weighed, anodized aluminum plates using a No. 30 wire-wound (draw-down) rod. Four specimens were made for each colorant/formulation combination. The samples from Formulation (1) were then allowed to dry and cure at room temperature for 7 days. Those from formulation (2) were air-dried, then cured at 121° C. for 20 minutes. Finally, samples from formulation (3) were air-dried and cured at 135° C. for 20 minutes.

Cured samples were re-weighed to determine the coating add-on and thence the amount of colorant present. The coated samples were then immersed individually in one of four extraction solvent systems shown in Table IV. Water and detergent at 60° C. simulates the effect of washing the coating repeatedly in hot weather conditions. Hexane simulates gasoline, while methanol and toluene are much more aggressive solvents found in minor proportions in some gasolines. Methanol is also used in some windshield washer fluids. After the indicated exposure time, samples of extraction fluid were examined spectrophotometrically, and the amount of colorant present determined after subtracting the appropriate blank (no colorant).

The data in Table IV indicate a high level of chemical bonding in all cases. Since there was no clear top-coat on these samples, the solvent had direct access to any surface colorant, which had less chance for chemical reaction. Subsequent application of a top-coat would allow such surface colorant a second change for reaction.

TABLE IV

Chemical Bonding of Colorants in Exterior Coatings

| Coating System | Reactive Colorant | % Bound After Extraction With: | | | |
|---|---|---|---|---|---|
| | | Water & Detergent 60° C./72 hrs. | Hexane 25° C./72 hrs. | Methanol 25° C./72 hrs. | Toluene 25° C./72 hrs. |
| Formulation (1) | Orange B | | | 94.5 | 94.8 |
| | Red C | | | 94.6 | 94.9 |
| | Blue G | | | 98.7 | 98.6 |
| Formulation (2) | Orange B | 99.6 | 99.8 | 98.4 | 98.6 |
| | Red C | 99.8 | 100.0 | 97.4 | 97.8 |
| | Blue G | 99.8 | 100.0 | 99.3 | 99.5 |
| Formulation (3) | Orange B | 97.8 | 99.7 | 97.1 | 98.5 |
| | Red C | 99.0 | 99.8 | 97.1 | 99.0 |
| | Blue G | 99.7 | 99.5 | 99.2 | 99.2 |

EXAMPLE 10

Four reactive colorants—Yellow M, (3%) (Example 4); Orange B, 2%, Red C, 2%; and blue G, 2% (Example 1) were incorporated separately into the following acrylic-melamine coating formulation.

|  | As is Basis | Active Solids |
|---|---|---|
| Acryloid AT-400CA reactive acrylic resin | 4.3 | 3.75 |
| Cymel 303 melamine resin | 1.75 | 1.75 |
| Cycat 600 | 0.039 | |
| Di-isopropanolamine | 0.012 | |

The formulations were applied to plates, dried, and cured as described in Example 9 formulation (3). Then a clear, uncolored top-coat from the above formulation was applied using a No. 40 draw-down rod, dried, and cured at 135° C. for 20 minutes.

Separate cured samples were extracted with several solvents with the results shown in Table V. Even though a majority of the coating films separated from the aluminum plates, resulting in direct solvent contact with base-coat, the extent of chemical bonding is very high.

TABLE V
Chemical Bonding of Reactive Colorants in an Acrylic-melamine Automotive Coating

| Reactive Colorant | % Bound After Extraction With: | | |
|---|---|---|---|
| | Water & Detergent 60° C./ 72 hrs.* | Hexane 25° C. 72 hrs. | Toluene 25° C. 72 hrs.* |
| Yellow M | 98.9 | 99.9 | 98.9 |
| Orange B | 99.4 | 99.9 | 98.8 |
| Red C | 99.5 | 99.9 | 99.7 |
| Blue G | 100 | 100 | 99.7 |

*Coatings Separated from Plate on each plate was calculated from the weight gain. Plates were then extracted with the solvents shown in Table VI, from which it can be seen that a high level of chemical bonding of the reactive colorant was attained.

TABLE VI
Chemical Bonding of an Amine-terminated Reactive Colorant in an Acrylic/Isocyanate Auto Coating

| Substrate | % Bound After Extraction With: | | | |
|---|---|---|---|---|
| | Water & Detergent 60° C./ 72 hrs. | Methanol 25° C./ 120 hrs. | Hexane 25° C./ 72 hrs. | Toluene 25° C./ 120 hrs. |
| Anodized Aluminum | 100 | 95.4 | 100 | 96.6 |
| Epoxy-primed Aluminum | 99.7 | 99.7 | 100 | 97.5 |

EXAMPLE 12

The following reactive colorants:

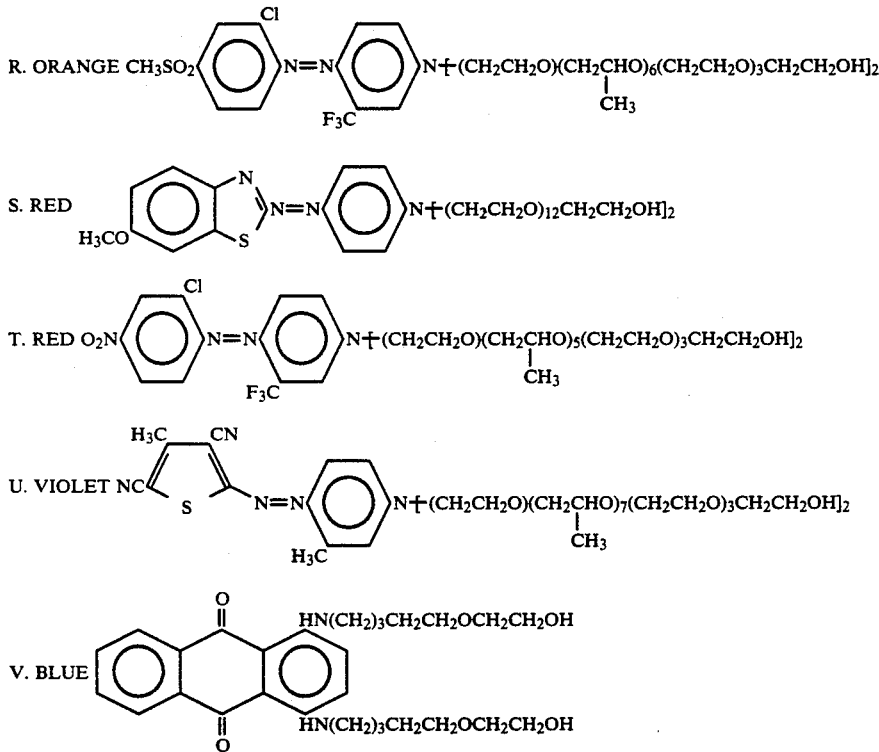

EXAMPLE 11

The reactive colorants involved in Examples 9 and 10 all have reactive primary or secondary alcohol groups. In the present example, the colorant Blue Q (Example 5) with reactive primary amine groups was used. This colorant was added at a level of 2% on total coating polymer solids in the acrylic-isocyanate formulation of Example 4, from which the U.V. absorber and light stabilizer were omitted.

Colored base-coats and clear, uncolored top-coats were applied to both anodized aluminum and epoxy-primed aluminum plates. Blank base-coats were also made with no colorant. After air-drying, curing was done at 90° C. for 30 minutes. The amount of colorant along with Orange B (Example 1) were incorporated, at the levels shown in Table XI, into an acrylic-isocyanate coating system using the formulation of Example 4. Colored base-coats followed by clear top-coats were applied to epoxy-primed aluminum plates following the procedure outlined in Example 4.

The coated plates were exposed in the QUV tester producing the results shown in Table VII.

Orange R shows excellent lightfastness; it is similar in nature to Orange B (Example 1), except for the addition of a —CF$_3$ group.

Red S is structurally related to Red C, but has different substitution in the benzothiazole moiety. Evidently this change causes a tremendous deterioration in lightfastness.

The chromophore portion of Red T is identical to that of Red D; the difference lies in the poly(alkylene oxide) side chain. Because of this change, Red T shows higher compatibility with the coating formulation. Apparently this change has no significant effect on lightfastness, which remains excellent.

Violet U shows only moderate lightfastness.

Blue V is related structurally to both Blue G and Blue Q. Its lightfastness is poor and similar to that of Blue Q, presumably for the reasons discussed in Example 5.

TABLE VII

Lightfastness of Reactive Colorants in an Acrylic-Isocyanate Automotive Coating

| Reactive Colorant | Amount used, % base on polymer | Delta E After QUV Exposure, Hours | | | | | |
|---|---|---|---|---|---|---|---|
| | | 250 | 500 | 850 | 1000 | 1400 | 1700 |
| Orange R | 3 | 0.2 | 0.1 | 0.5 | NA | NA | NA |
| Red S | 1 | 4.5 | — | — | — | — | — |
| Red T | 2 | 0.2 | 0.3 | 0.4 | 0.6 | 1.0 | 0.8 |
| Violet U | 2 | 0.6 | 1.0 | 1.5 | 1.7 | 1.8 | 2.5 |
| Blue V | 2 | 4.0 | — | — | — | — | — |
| Orange B | 2 | 0.3 | 0.3 | 0.6 | 0.8 | 0.7 | 0.7 |

NA — not available - testing still in progress.

EXAMPLE 13

A typical reactive polyester is made by condensation reaction involving neopentyl glycol, adipic acid, isophthalic acid and pentaerythritol, the first three reactants are difunctional with both reactive groups being involved in the polymerization. Since the pentaerythritol is tetra-functional, two of the primary alcohol groups are available as pendant reactive groups on the final polymer. The terminal reactive groups are predominantly primary hydroxyl or carboxyl groups, depending on the polymerization stoichiometry.

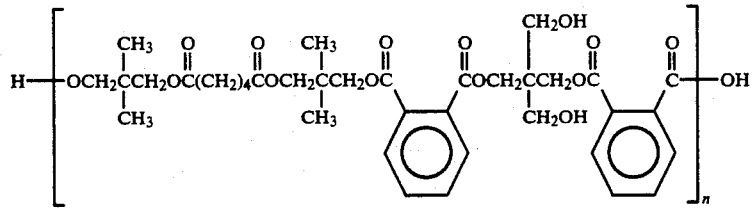

Additional examples of polyester resin coatings may be found in "Automotive Coatings" by Bruce McBane, published by the Federation of Societies for Coatings Technology, Philadelphia, Pennsylvania.

What we claim is:

1. A colored polymeric coating prepared by a process comprising the steps of: contacting an acrylic polymer having reactive pendant groups selected from hydroxyl, amine, amide, and carboxylic acid and a linking agent having first and second reactive groups each of which are independently selected from:

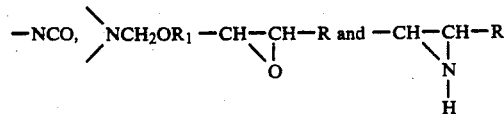

wherein R is hydrogen or a $C_1$–$C_6$ alkyl group, provided that said first reactive group of said linking agent is capable of reacting with said reactive group of said polymer to form a covalent bond, contacting said linking agent and a reactive colorant having the general formula:

A-[POLYMERIC CONSTITUENT-X]$_N$ wherein A is an organic dyestuff radical selected from nitroso, nitro, azo, diarylmethane, xanthene, acridine, methine, thiazole, indamine, azine, oxazine, and anthraquinone dyestuff radicals, the polymeric constituent is a polymer chain comprising the residues of at least three monomer units selected from ethylene oxide, propylene oxide and butylene oxide, X is a reactive moiety selected from —OH, —NH$_2$ and —SH, and n is an integer from 1 to 6, provided that said second reactive group of said linking agent is capable of reacting with said reactive moiety of said colorant to form a covalent bond, and maintaining said polymer, said linking agent and said colorant at a temperature sufficient to react said reactive group of said polymer and said first reactive group of said linking agent to form a covalent bond between said polymer and said linking agent, and further maintaining said temperature sufficient to react said second reactive group of said linking agent with said reactive moiety of said colorant to form a covalent bond between said linking agent and said colorant.

2. A coating according to claim 1 wherein said organic dyestuff radical is an azo or anthraquinone radical.

3. A coating according to claim 2 wherein said polymeric constituent of said colorant comprises from 5 to 50 of said monomer units.

4. A coating according to claim 1 wherein said reactive group of said polymer is a pendant hydroxyl or carboxylic acid group.

5. A coating according to claim 4 wherein said organic dyestuff radical is an azo or anthraquinone radical.

6. A coating according to claim 5 wherein said linking agent is a melamine-formaldehyde resin or polyisocyanate.

7. A coating according to claim 6 wherein said reactive moiety of said colorant is —OH.

8. A coating according to claim 4 wherein said linking agent is a melamine-formaldehyde resin.

9. A coating according to claim 8 wherein said polymeric constituent of said colorant comprises from 5 to 50 of said monomer units.

10. A coating according to claim 9 wherein said organic dyestuff radical is an azo or anthraquinone radical.

11. A coating according to claim 10 wherein said reactive moiety of said colorant is —OH.

12. A coating according to claim 9 wherein said temperature is maintained at at least 90° C. and said reactions between said polymer and said linking agent, and between said linking agent agent and said colorant are condensation reactions.

13. A coating according to claim 3 wherein said temperature is maintained between 90° and 180° C. during said reactions between said polymer and said linking agent, and between said linking agent and said colorant.

14. A coating according to claim 3 wherein said linking agent is a melamine-formaldehyde resin.

15. A coating according to claim 1 wherein said linking agent is a polyisocyanate.

* * * * *